United States Patent

[11] 3,548,968

| [72] | Inventor | Robert R. Aronson |
| | | Ferndale, Mich. |
| [21] | Appl. No. | 706,157 |
| [22] | Filed | Feb. 16, 1968 |
| [45] | Patented | Dec. 22, 1970 |
| [73] | Assignee | Electric Fuel Propulsion, Incorporated |
| | | Ferndale, Mich. |
| | | a corporation of Delaware |

[54] AIR SUPPORTED ELECTRIC VEHICLE
9 Claims, 3 Drawing Figs.

[52] U.S. Cl. .................................................. 180/119,
180/117, 180/128
[51] Int. Cl. ...................................................... B60v 1/00
[50] Field of Search............................................. 180/119,
116, 117, 120, 121, 127, 128

[56] References Cited
UNITED STATES PATENTS

| 3,229,781 | 1/1966 | Jones................................ | 180/119 |
| 3,189,115 | 6/1965 | Rethorst.......................... | 180/116X |
| 3,263,764 | 8/1966 | Bertin............................. | 180/121 |
| 3,398,809 | 8/1968 | Wood et al. ................... | 180/119 |

Primary Examiner—A. Harry Levy
Attorney—Cushman, Darby and Cushman

ABSTRACT: The invention relates to a vehicle which is supported by propelling members which propel the vehicle along the face of the earth and includes air directing means which serves to decrease the weight which the propelling means support. In one embodiment, fan blades are rotated to pull streams of air through a number of holes in the housing of a wheeled vehicle and into an area between two concentric, cylindrical, flexible skirts to form a cushion which partially supports the weight of the vehicle. A movable plate can be rotated or moved to alter the amount of air flowing through the holes. The fan blades may be driven through gears from a small wheel which contacts the ground. Coils may be wound on the blades and magnets disposed about the path of the blades so that currents are induced in the coils which can be rectified are used to recharge the batteries.

PATENTED DEC 22 1970 3,548,968
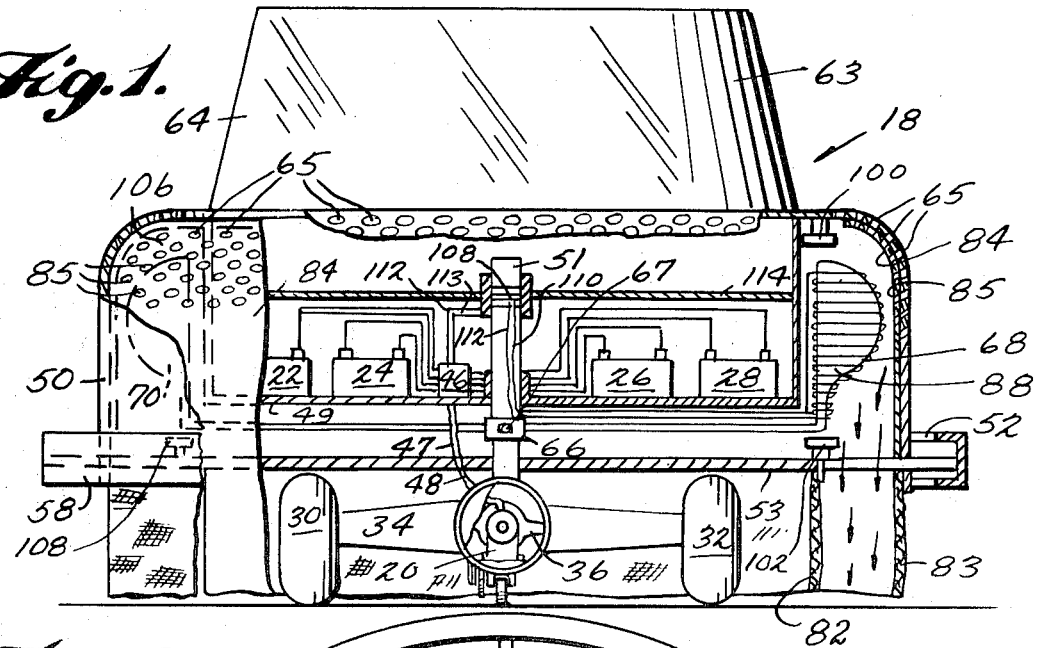
Fig. 1.
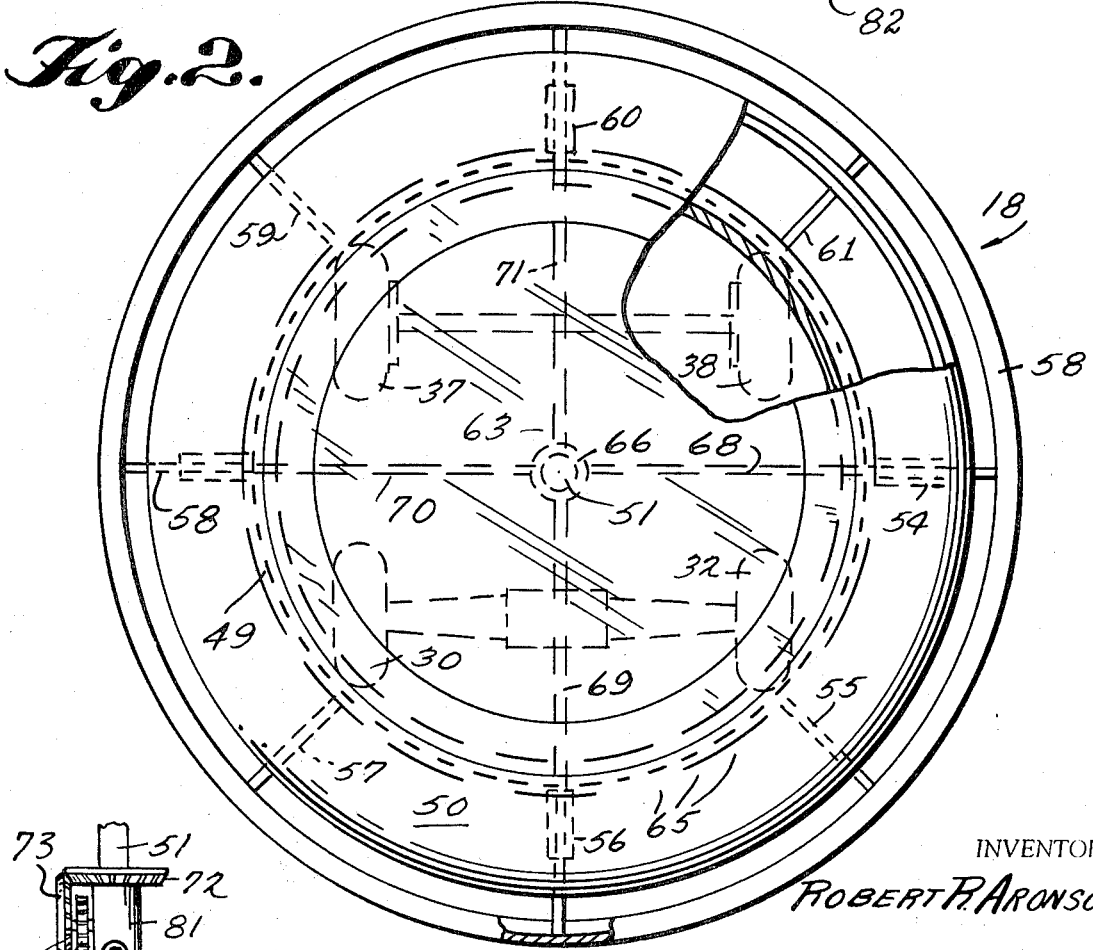
Fig. 2.
Fig. 3.
INVENTOR
ROBERT R. ARONSON
BY Cushman, Darby & Cushman
ATTORNEYS

AIR SUPPORTED ELECTRIC VEHICLE

DESCRIPTION OF THE PRIOR ART AND SUMMARY OF THE INVENTION

This invention relates to a vehicle which is supported by a plurality of propelling members which propel the vehicle along the surface of the earth and includes air directing means which serves to decrease the weight which the wheels support.

This invention is particularly useful in connection with vehicles which have a plurality of wheels and which are propelled by electric motors. Most such vehicles carry a rechargeable source of electrical energy. However, the invention is not limited to any particular type of vehicle, and is useful in conserving energy in any type of vehicle.

Around the beginning of the twentieth century, three types of automobiles were locked in a fierce competition for the fledgling automobile market—the steam automobile, the electric automobile and the gasoline automobile. The gasoline automobile emerged the victor and has since grown to be the center of an enormous industry, and indeed an entire way of life. The problems which caused the electric automobile then to fall behind have still not yet been completely overcome. The weight, range, speed and acceleration of most electrically propelled vehicles, although improved somewhat, is still somewhat less than totally competitive with gasoline automobiles. However, the virtues of the electric automobile, such as quietness, lack of waste pollutants and inexpensive operation, are such that, even with its drawbacks, the electric automobile is beginning to carve a niche in the enormous automobile market.

The drawbacks have been mitigated somewhat by the use of improved conventional lead acid storage batteries as well as radically different storage batteries. In addition, techniques have been developed for conserving the stored energy within the storage batteries and for utilizing that energy as efficiently as possible. One such technique involves apparatus for recovering a portion of the kinetic energy of the vehicle which would otherwise be dissipated in braking by regeneratively braking the vehicle and is described in a patent application entitled "Regenerative System for Electric Vehicles," application Ser. No. 693,433 filed Dec. 26, 1967 now U.S. Pat. No. 3,530,356 by Robert R. Aronson.

This invention relates to another such technique for conserving energy. In one embodiment, the weight of the vehicle supported by the wheels can be lessened while the vehicle is in motion by forcing a number of streams of air through the vehicle so that the streams of air form a cushion of air which partially supports the vehicle. This then reduces the amount of energy required to push the vehicle along the ground. In the embodiment described in detail below, rotating fan blades pull streams of air as the vehicle is moving through each of a number of small holes, which have been punched in the outer housing of the vehicle, and direct the air streams into an area bounded by flexible skirts or sheets which ring the vehicle. The skirts, although allowing leakage, serve to partially contain the air streams so that they form a cushion which partially supports the vehicle. In addition, coils of wire may be wound around the fan blades, and magnets disposed about the blades, so that an alternating current is induced in the coils of wire as the fan blades rotate. This alternating current can then be rectified by a commutator on the vertical shaft which rotates the fan blades or by any other suitable means and utilized to recharge the batteries, thereby returning a portion of the energy used to rotate the fan blades to the batteries.

In the embodiment detailed below, the fan blades are mounted on a vertical shaft which is rotated by gears which are in turn rotated by a small wheel which is in contact with the ground and which rotates as the vehicle moves along the ground. The speed of rotation of the fan blades and hence the amount of weight supported by the cushion formed by the air streams are then a function of the speed of the vehicle. At low speeds most of the weight will be supported by the wheels with the cushion formed by air streams supporting increasing weight as speed increases. Since the weight on the wheels is proportional to the frictional force generated by the wheels and hence determines the time and distance required to accelerate or stop, the weight is maximized when the need for it is greatest. If the full weight of the vehicle is desired to be returned to the wheels, for example because of an emergency at high speed, the rotation of the fan can be prevented by simply shifting the shaft upwards so that the gears no longer mesh, preventing rotation of the shaft, or by any other suitable disabling means. The rotation of the fan blades and hence the partial weight support by the air streams can then be ended abruptly and the full weight of the vehicle returned to the wheels.

An additional measure of control of the weight supported by the air stream is described in the embodiment discussed below whereby a movable plate mounted inside the housing of the vehicle can be moved or rotated to increase or decrease the size and/or number of the holes in the housing through which the air is being pulled. The plate can be abutted directly against the housing so that the air streams can be completely closed off or the plate can be located on the floor of the vehicle so that the air streams cannot pass through the vehicle and into the area between the skirts so that the airstreams push down on the floor of the vehicle causing vehicle weight to increase. The weight that the air stream supports can then be simply and easily adjusted by slightly moving or rotating this plate.

This invention then is extremely versatile in that a great portion of the weight supported by the wheels can be slightly altered as well as abruptly removed or returned. Hence, a great deal of energy can be conserved when the vehicle is moving, by removing part of the weight of the vehicle, without sacrificing the advantages of weight in braking and starting, so that the advantages of both a light car and a heavy vehicle are present. Should it be necessary or desirable that all the weight be present on the wheels, as for example in anticipation of a slick or icy surface, this can be rapidly accomplished by rotating the movable plate or preventing the shaft from rotating. It may even be desirable to move or rotate this plate, cutting off the streams of air through the housing thereby, whenever braking occurs by associating the mechanism which operates the plate with the brake pedal.

Other objects and purposes of the invention will become clear after reading the following detailed description of the drawings.

BRIEF DESCRIPTION OF THE DRAWINGS

FIG. 1 shows a cutaway view of one embodiment of the air supported vehicle.

FIG. 2 shows a view of the air supported vehicle of FIG. 1 shown from the top.

FIG. 3 shows the gear and wheel arrangement which turns the vertical shaft.

DETAILED DESCRIPTION OF THE DRAWINGS

Reference is now made to FIG. 1 which shows a cutaway view of one embodiment of the invention and to FIG. 2 which shows a top view of the vehicle of FIG. 1. In this embodiment, the means of propelling the vehicle 18 is an electric motor 20 driven from storage batteries 22, 24, 26, 28 carried within the vehicle. The present invention, however, is not limited to any particular means of driving the vehicle 18 and can be used successfully with many other types of vehicles, such as automobiles with gasoline engines. Neither should the structural features of the particular vehicle 18 shown in FIGS. 1 and 2 be considered as a limitation of the invention. The invention is similarly applicable to vehicles of many diverse shapes and structures.

Two wheels 30 and 32, which are, for the purposes of illustration, assumed to be the rear wheels, are driven through an axle 34 and a differential 36 by the DC electric motor 20, to cause the vehicle 18 to move. The two front wheels 37 and 38 are not driven by the motor 20 but may be used for steering or for any other purpose such as they might be used for in conventional or other vehicles. The invention is not limited to wheeled vehicles however, and can be also used with vehicles having other propelling members, such as treads. The energy which excites the electric motor 20 in this embodiment is stored within four storage batteries 22, 24, 26, 28 which may be conventional lead acid storage batteries or any other suitable type. The number of batteries can of course be changed to suit whatever the needs of the vehicle are. The four batteries of this embodiment, 22, 24, 26 and 28, can be connected in various parallel and serial arrangements by a control mechanism 46 in response to commands from the driver of the vehicle 18 which, for example, may be communicated through the accelerator foot pedal (not shown). For example, if very little torque were desired to be applied to the wheels 30 and 32, all of the batteries might be connected in parallel and the parallel connection then applied to the electric motor 20. Should the maximum excitation be desired to be applied to the motor 20 and hence the maximum torque to wheels 30 and 32, all of the batteries could be connected serially. Between these two voltages, the batteries can be connected in a number of combinations of serial or parallel arrangements so that a number of different voltages and hence torques can be generated. The voltage thus generated can then be communicated from the control mechanism 46 to the electric motor 20 through wires 47 and 48. This arrangement is described more fully in connection with application No. 693,433 entitled "Regenerative System for Electric Vehicle," filed Dec. 26, 1967, by Robert R. Aronson.

The batteries 22, 24, 26, and 28 as well as the control mechanism 46 are shown resting upon a battery platform 49. In this embodiment, the platform 49 is a cylindrical, hollow, open ended container having the center of the vehicle as its axis. In this embodiment the platform 49 is suspended from the housing 50 of the vehicle 18 and has a central opening through which the shaft 51 passes. It may prove desirable to locate the batteries in another location and this may be easily accomplished without disturbing the operation of the invention as described.

In the particular embodiment shown in FIGS. 1 and 2 the vehicle 18 is substantially round and girded by a circular bumper 52 which is attached to the floor 53 of the vehicle 18 by eight metal spokes 54, 55, 56, 57, 58, 59, 60 and 61 which also support the housing 50. The method of supporting the bumper 52 and the specific number of spokes are merely illustrative. More spokes could be added or some subtracted if necessary to support the bumper. The spokes might also radiate from a central hub rather than being attached to the floor 53 as shown. Alternatively a circular solid metal disc which could also serve as the floor of the vehicle 18 could be used to support the bumper 52 in place of the spokes 54, 55, 56, 57, 58, 59, 60, and 61 provided that the disc is slotted so that the air streams can flow through the vehicle and help the support of the weight of the vehicle as described below.

The vehicle 18 further has a metal roof 63 and a wrap around window 64 through which the driver can see. Entry into the vehicle 18 may be by sliding doors (not shown). The housing 50 which reaches from the bumper 52 to the window 64 has been punched with a large number of small holes 65 which may be of the order of one-sixteenth of an inch in diameter. Through these holes 65 air is drawn to partially support the wheels. The vertical shaft 51 which is in this embodiment situated in the center of the vehicle 18 is adapted to rotate four fan blades 68, 69, 70 and 71 in order to move the streams of air through the vehicle. The four blades are attached to the shaft 51 by a central hub or connecting device 66 which binds the shaft 51 to the blades 68, 69, 70, and 71 by a set screw 67 or some other suitable means. The blades 68, 69, 70, and 71 may be constructed from copper, brass or some other suitable material, and more blades can be added or some subtracted as desired to meet the requirements of the particu- Referring to FIG. 3, the shaft 51 is shown attached to the horizontal gear 72 which in turn meshes with a vertical gear 73 which is driven by another vertical gear 74 both of which are attached to a common shaft 75. The vertical gear 74 meshes with yet another gear 76 which is connected via another shaft 78 to a small wheel 80 which ordinarily contacts the ground. The drop wheel 80 is held in place by a stationary support 81 within which the shaft 51 is journaled so as to rotate freely. The support 81 also holds the shaft 75 while allowing it to freely rotate. The rotation of the drop wheel 80 as the vehicle 18 moves is then communicated through the gears 76, 74, 73 and 72 to the shaft 51 so that the shaft 51 turns when the wheel 80 turns.

The shaft 51 may be disengaged by simply backing the shaft 51 upwards away so the gears 73 and 72 do not mesh or by any other suitable means; for example, a clutch assembly on the shaft 51 might engage or disengage the fan blades 68, 69, 70, and 71. The small wheel 80 might also be drawn upwards out of contact with the ground to prevent rotation of the shaft 51.

Alternatively, the shaft 51 might be driven directly by the motor 20 through a gear arrangement such as shown in FIG. 3 or by any other suitable means. In such an arrangement where the motor 20 drives the shaft 51 directly, however, the speed of rotation of the shaft 51 would be a function of the speed of the motor 20 instead of the speed of the vehicle 18. Of course, even with the arrangement shown in FIG. 3, the motor 20 drives the shaft 51 indirectly since energy must be expended to drag the small wheel 80 along the ground.

The rotation of the shaft 51 rotates the fan blades 68, 69, 70 and 71, directing the streams of air through the housing 50 and into the space confined by the skirts or sheets 83 and 84 which ring the vehicle 18. The skirts or sheets 83 and 84 may be constructed of any suitable material such as rubber and are formed into two, concentric cylindrical elements. The spokes 54, 55, 56, 57, 58, 59, 60, and 61 also serve to support the sheet 83 without impeding the flow of air into the sheets. The air confined between the sheets 83 and 84 then rises to a pressure above atmospheric pressure as more air enters while a limited amount of air escapes. This causes the confined air to exert an upward force which partially supports the vehicle 18, thereby removing part of the vehicle weight from the wheels. The airstreams could instead be directed into one or a number of smaller confined areas which might each, for example, be ringed with a cylindrical, flexible, skirt, so that upward forces would be applied to one or more discrete areas. The number of the blades is of course merely illustrative and more may be added or subtracted as desired. The system may be designed so that the air streams are directly slightly inward toward the center of the vehicle 18 making an angle of about 10° with the vertical.

A movable plate 84 which is mounted within the housing 50 is adapted to be rotated slightly so as to align or misalign its holes 85 with the holes 65 in the housing 50. The amount of air which is drawn through the housing 50 and hence the weight supported by the streams of air can then be carefully regulated by rotating the movable plate 84. The plate 84 may be rotated by operation of a manual control switch operated on the dash (not shown) or by an automatic control device (not shown) which rotates the plate 84 in response to a condition such as foot pressure on the brake pedal or accelerator. Alternatively the plate 84 may be fixed and adjustable only by manual rotation while the vehicle is stopped. In place of the plate 84 another plate or plurality of plates could be used to block the flow of air from the housing 50 into the area between the skirts 82 and 83. This arrangement has the added advantage the effective weight on the wheels 30, 32, 37 and 38 of the vehicle 18 can actually increase by the downward pressure of the air streams on the floor 53 of the vehicle 18.

In addition to forcing streams of air through the housing 50 to partially support the vehicle 18, the rotation of the blades 68, 69, 70 and 71 can also generate an electric current which can be used to recharge the batteries 22, 24, 26 and 28. For example, a coil of wire 88, which may be copper wire with an insulating coating, is shown wound about the fan blade 68. Similar coils could be wound about blades 69, 70 and 71. A number of magnets, either permanent magnets, electromagnets or both, are disposed about the path of the blades, for example in pairs, each pair having one magnet above such as magnet 100 and one magnet below such as magnet 102 the path of the rotating blades, so that the movement of each of the blades continually cuts lines of flux, thereby inducing a current in the coil 88 as well as in the other coils wound on blades 69, 70 and 71. The magnets could be disposed in any manner about the path of the rotating blades which would result in inducing current in the coils wound about the blades 68, 69, 70 and 71. The magnets 100 and 102 are shown as an example of one set of magnets and the magnets 104 and 106 as another example.

The current thus induced in coil 88 as well as the coils wound about blades 69, 70 and 71 is then conducted to a commutator 108 mounted on the vertical shaft 51 via lines 110 and 111. The commutator 90 rectifies the alternating current induced within the coil 88, as well as within the other coils wound around each of the other fan blades 69, 70 and 71 and applies the direct current thus produced to the control mechanism 46 through wires 112 and 113. The control mechanism 46 then acts to recharge the batteries 22, 24, and 26. The exterior connections of the commutator 108 are held in position by a disc 114 which is mounted on the platform 49. The disc 114 has a central opening to permit the shaft 51 to pass through and also serves as a roof for the battery platform 49.

Summarizing the operation of this embodiment, a vertical shaft 51 is rotated by a small wheel 80 whenever the vehicle 18 is in motion. The rotation of the vertical shaft 51 in turn rotates fan blades 68, 69, 70 and 71 to direct air through the housing 50 and into the area confined by the skirts 82 and 83 so that the air forms a cushion which supports a portion of the weight of the vehicle 18. A movable plate 84 is adapted to control the amount of air passing through the housing 50 by aligning or misaligning the holes 65 in the housing 50 with the holes 85 in the plate 84 and hence the amount of air moving into the area between the skirts 82 and 83. In addition, the rotation of the fan blades 68, 69, 70 and 71 may induce current in coils of wire wound on the blades 68, 69, 70 and 71, such as coil 88 on blade 68, as flux lines from magnets spaced about the path of the blades, such as magnets 100 and 102, are cut. The current thus induced is then used to recharge the batteries 22, 24, 26 and 28 which supply the energy to propel the vehicle 18.

Since the present system discloses means to convert part of the expended energy into electric energy for return to the batteries, it is evident that the batteries will last considerably longer than in prior known systems before being sufficiently discharge to require recharging thereof from an external source.

The embodiment detailed above is merely one example of the invention and many modifications and changes are possible without departing from the spirit of the invention.

I claim:

1. An air supported vehicle having a body at least partially supported by at least one propelling member in contact with the surface of the earth comprising:
    a motor for operating said propelling member to move said vehicle along the surface of the earth;
    means for directing at least one stream of air so as to decrease the weight supported by said propelling member including at least a single fan blade adapted to be rotated when said vehicle is in motion;
    a housing surrounding said fan blade having a plurality of openings through which air is drawn by said fan blade to create said stream of air; and
    a movable plate, said plate being associated with said housing so as to regulate the amount of air passing through the openings in said housing.

2. A vehicle as in claim 1 wherein said plate has a number of openings and is movable so as to align said plate openings with said housing openings.

3. An air supported vehicle having a body at least partially supported by at least one propelling member in contact with the surface of the earth comprising:
    motor for operating said propelling member to move said vehicle along the surface of the earth;
    means for directing at least one stream of air so as to decrease the weight supported by said propelling member including a plurality of fan blades adapted to be rotated when said vehicle is in motion; and
    a coil of wire wound about each said blade, and a plurality of sets of magnets disposed about the path of rotation of said blades so that the rotation of said blades causes an electrical current to appear in each said coil.

4. A vehicle as in claim 3 wherein said motor is excited to move said vehicle whenever a direct current voltage is applied to said motor and including a source of direct current voltage adapted to be applied to said motor.

5. A vehicle as in claim 4 including a vertical shaft rotating said fan blades along an axis approximately perpendicular to the ground and a commutator circuit mounted on said shaft to convert the current produced in each said coil to direct current voltage and to apply the direct current voltage thus produced to said source to recharge said source.

6. An air supported vehicle having a body supported by a plurality of wheels comprising:
    an electric motor adapted to rotate said wheels to cause movement of said vehicle whenever a direct current voltage is applied to said motor;
    a source of direct current voltage adapted to be applied to said motor;
    a plurality of fan blades adapted to be rotated to direct a plurality of streams of air so as to decrease the weight supported by said plurality of wheels;
    a vertical shaft adapted to rotate said fan blades;
    a wheel adapted to contact the ground and to rotate when said vehicle is in motion and to cause said vertical shaft to rotate;
    a housing surrounding said fan blades having a plurality of openings through which air is drawn by said blades to produce said streams of air;
    a movable plate associated with said housing having a plurality of openings, said plate being movable to align said plate openings with said housing openings;
    a plurality of skirts extending between said housing and the ground to contain said streams of air directed by said fan;
    a coil of wire wound around each said blade,
    a plurality of sets of magnets disposed about the path of rotation of said fan blades, each set comprising a magnet above the path of said fan blades and a magnet below the path of said fan blades so that the rotation of said fan blades causes an electric current to appear in each said coil; and
    a commutator circuit on said shaft adapted to convert the voltages in each said coil to a direct current voltage and to apply the direct current voltage thus produced to said source to recharge said source.

7. An air supported vehicle having a body at least partially supported by at least one propelling member in contact with the surface of the earth comprising:
    motor means for operating said propelling member to move said vehicle along the surface of said earth;
    fan means including a plurality of blades mounted for substantially horizontal rotation, a coil of wire wound around each said blade and a plurality of sets of magnets disposed about the path of rotation of said blades so that rotation of said blades causes an electrical current to appear in each said coil;
    a flexible skirt mounted on said body, and enclosing a space between said vehicle and the surface of the earth; and frame means mounted on said body having a plurality of apertures so that the air outside said vehicle is drawn through said apertures into said space enclosed by said skirt by said fan means to produce an upward force reducing the weight supported by said propelling member.

8. A method of operating a vehicle comprising the steps of:

driving at least a single propelling member of said vehicle, supporting at least of the weight of said vehicle, so that said vehicle moves along the surface of the earth;

rotating at least a single fan blade mounted for substantially horizontal rotation so that air is drawn into a space, enclosed between the vehicle and the surface of the earth by a flexible skirt, through a plurality of apertures in the frame of said vehicle to produce an upward force reducing the weight supported by said driving member, and moving a plate associated with said frame to regulate the amount of air passing through said apertures and the upward force produced.

9. A method of operating a vehicle comprising the steps of:

driving at least a single propelling member of said vehicle, supporting at least part of the weight of said vehicle, so that said vehicle moves along the surface of the earth;

rotating at least a single fan blade mounted for substantially horizontal rotation so that air is drawn into a space, enclosed between the vehicle and the surface of the earth by a flexible skirt, through a plurality of apertures in the frame of said vehicle to produce an upward force reducing the weight supported by said driving member;

supplying electrical energy to an electrical motor, from at least a single battery, to drive said propelling member; and applying electrical current, generated in a coil wound about each said blade as said blade rotates through a magnetic field, to said battery.